(No Model.)
F. McDONOUGH.
BAND SAW MACHINE.
No. 457,055. Patented Aug. 4, 1891.
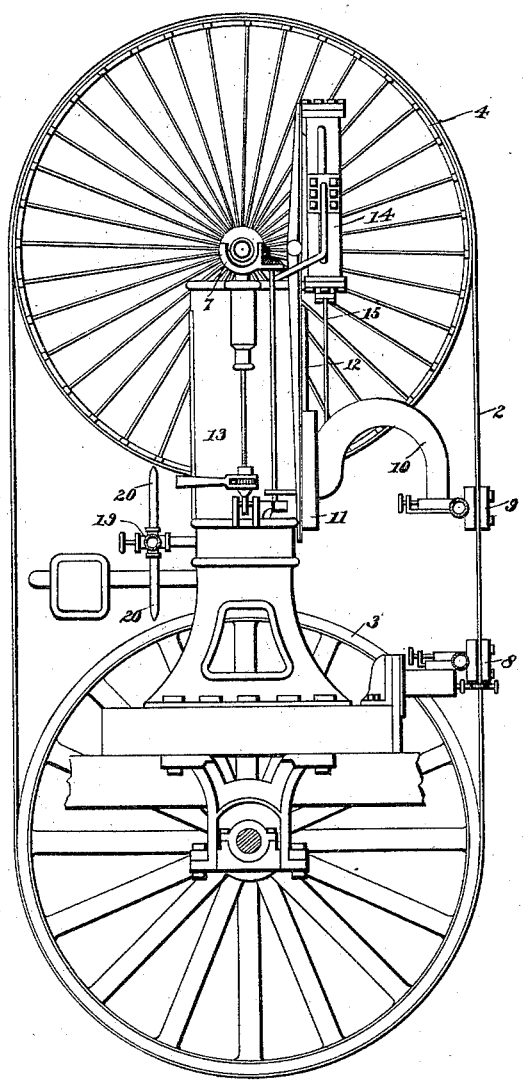
Witnesses;
Inventor
F. McDonough,
By his Attorneys,

UNITED STATES PATENT OFFICE.

FRANK McDONOUGH, OF EAU CLAIRE, WISCONSIN.

BAND-SAW MACHINE.

SPECIFICATION forming part of Letters Patent No. 457,055, dated August 4, 1891.

Application filed May 15, 1889. Serial No. 310,840½. (No model.)

*To all whom it may concern:*

Be it known that I, FRANK MCDONOUGH, a citizen of the United States, residing at the city of Eau Claire, in the county of Eau Claire and State of Wisconsin, have invented a new and useful Improvement in Band-Saw Machines, of which the following is a full description, reference being had to the accompanying drawing.

My invention relates to saw-mills for machines in which an endless-band saw is carried upon and driven by wheels or drums; and its object is to provide improved means for cleansing such wheels or drums from the accumulation of sawdust and other foreign substances which cling and adhere to them while the saw is in use, and which when allowed to remain and harden upon said wheels form obstructions which seriously interfere with the operation of the saw.

My invention consists in means for applying to the said wheels a light spray or bath, preferably of water, for the purpose of dislodging and carrying away the foreign substances which are clinging to them before they have firmly adhered or have the opportunity to become fixed upon the wheels or upon the saw-blade.

My invention further consists in the construction and combination of parts which will be hereinafter fully described, and particularly pointed out in the claims.

The accompanying drawing, forming a part of this specification, is a side elevation of a band-saw mill fitted with my improved device.

In the drawing, 2 represents a band-saw mounted upon the driving-wheel 3 of the mill, which is journaled in suitable bearings upon the supporting-frame 5 in the usual manner.

4 is an idler, the shaft of which is journaled in boxes or bearings 7, for the vertical adjustment of which suitable well-known means are provided. Such adjusting means, however, form no part of the present invention, and need not be described in detail.

8 and 9 designate, respectively, the lower and the upper saw-guides, the former of which is suitably attached to the bed of the machine, while the latter is mounted upon a vertically-adjustable arm 10, having a head-block 11 mounted upon suitable guideways 12 upon the supporting-column 13 of the machine. For the adjustment of the arm 10 of the upper saw-guide a steam-cylinder 14 is provided, the piston-rod of which 15 is suitably connected with the said arm 10. The adjusting mechanism for the latter, however, is not claimed in this specification.

19 designates a valved supply-pipe arranged between the saw-carrying wheels 3 4 and provided with nozzles 20, through which the cleansing-fluid from the pipe 19, which is to be connected with a suitable source of supply, may be discharged upon the faces of the saw-carrying wheels.

The operation and advantages of my invention will be readily understood. The cleansing-fluid is applied to the faces of the wheels 3 and 4 through the nozzles 20, thus removing foreign matter from the faces of said wheels.

I do not limit myself to the precise construction herein described, but claim as within the scope of my invention any means whatever by which the band-saw wheel or wheels are washed or bathed with a cleansing-liquid during the operation of the machine, as above described.

Having thus described my invention, I claim and desire to secure by Letters Patent of the United States—

1. In a band-saw mill or machine, the combination, with a band-saw wheel, of means for supplying a cleansing-liquid to the face of the wheel, whereby the wheel in its rotation is cleansed from foreign substances adhering to it, as and for the purpose set forth.

2. In a band-saw mill or machine, the combination, with a band-saw wheel, of a pipe having a nozzle adapted to continuously deliver upon the periphery of said wheel in its rotation a jet or spray of water or other cleansing-liquid, substantially as and for the purpose set forth.

F. MCDONOUGH.

Witnesses:
PETER JOHN HOLM,
WM. F. BAEBAUROTH.